US012665121B2

(12) United States Patent

Kobayashi et al.

(10) Patent No.: US 12,665,121 B2

(45) Date of Patent: Jun. 23, 2026

(54) STATIONARY INDUCTION ELECTRIC APPARATUS

(71) Applicant: Hitachi Industrial Equipment Systems Co., Ltd., Tokyo (JP)

(72) Inventors: Chie Kobayashi, Tokyo (JP); Naoyuki Kurita, Tokyo (JP); Kohei Sato, Tokyo (JP); Toshiaki Takahashi, Tokyo (JP); Hikaru Nakashima, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 755 days.

(21) Appl. No.: 17/987,260

(22) Filed: Nov. 15, 2022

(65) Prior Publication Data

US 2023/0238166 A1 Jul. 27, 2023

(30) Foreign Application Priority Data

Jan. 24, 2022 (JP) ................................ 2022-008563

(51) Int. Cl.
*H01F 27/28* (2006.01)
*H01F 27/26* (2006.01)
*H01F 41/02* (2006.01)

(52) U.S. Cl.
CPC ........... *H01F 27/263* (2013.01); *H01F 27/28* (2013.01); *H01F 41/0206* (2013.01)

(58) Field of Classification Search
CPC .... H01F 27/263; H01F 27/28; H01F 41/0206; H01F 27/2455; H01F 27/25; H01F 27/245; H01F 27/34
USPC .......................................... 336/212, 233–234
See application file for complete search history.

(56) References Cited

U.S. PATENT DOCUMENTS

| | | | | |
|---|---|---|---|---|
| 4,520,556 A | | 6/1985 | Pasko, Jr. et al. | |
| 4,761,630 A | | 8/1988 | Grimes et al. | |
| 4,972,573 A | * | 11/1990 | Yamamoto | H01F 41/0226 336/213 |
| 4,993,141 A | * | 2/1991 | Grimes | H01F 41/0213 336/213 |

(Continued)

FOREIGN PATENT DOCUMENTS

| | | | |
|---|---|---|---|
| JP | 2002083716 A | * | 3/2002 |
| JP | 2010-263233 A | | 11/2010 |

OTHER PUBLICATIONS

Hindi-language Office Action issued in Indian Application No. 202214067708 dated Mar. 11, 2026 with English translation (9 pages).

*Primary Examiner* — Tuyen T Nguyen
(74) *Attorney, Agent, or Firm* — Crowell & Moring LLP

(57) ABSTRACT

There is provided a static induction electric apparatus capable of improving smoothnesses of magnetic flux distributions inside iron cores. A stationary induction electric apparatus including wound iron cores and a winding, wherein each of the wound iron cores is a laminated body of magnetic materials that are lap-joined and at least provided with a step lap joint portion on an inner peripheral side of the wound iron core, and gap distances between ends of the step lap joint portion are gradually shortened toward an outer peripheral side of the wound iron core. Although a configuration of the stationary induction electric apparatus is simple, the stationary induction electric apparatus having improved smoothnesses of magnetic flux distributions inside the iron cores can be provided.

6 Claims, 5 Drawing Sheets

(56) References Cited

U.S. PATENT DOCUMENTS

2005/0280491 A1 12/2005 Yamashita et al.

* cited by examiner

STATIONARY INDUCTION ELECTRIC APPARATUS

CLAIM OF PRIORITY

The present application claims priority from Japanese Patent application serial No. 2022-8563, filed on Jan. 24, 2022, the content of which is hereby incorporated by reference into this application.

BACKGROUND OF THE INVENTION

The present invention relates to stationary induction electric apparatuses such as transformers, and reactors.

In a wound iron core of a stationary induction electric apparatus, for example, a transformer, magnetic flux densities tend to be high in the inner periphery of the iron core, and magnetic flux densities tend to be lower in the portions closer to the outer periphery of the iron core due to differences between magnetic path lengths of the inner periphery and the outer periphery of the iron core. In addition, in the wound iron core, eddy current losses increase due to magnetic flux concentrations generated by magnetic flux crossings at the ends of the wound iron core, resulting in the deterioration of the magnetic characteristic of the iron core. Especially, if the magnetic losses are large because magnetic flux densities become low in the outer periphery, the magnetic characteristic becomes deteriorated. Therefore, there is a problem that the magnetic flux distribution existing over the inner peripheral side and the outer peripheral side is not smoothed.

By the way, iron cores for which wound iron cores are frequently employed are iron cores for which amorphous materials are used. Although amorphous materials have better magnetic characteristics than silicon steel sheets, the thicknesses of the amorphous material sheets are very thin, about one tenth of the thicknesses of the silicon steel sheets (about 0.025 mm) and the hardnesses of the amorphous materials are extremely high as well, so that it is difficult to process the amorphous materials in the manufacturing of transformers.

Therefore, the manufacturing of wound iron cores of a transformer using amorphous materials is performed in such a processing procedure that a laminated structure is formed by stacking and laminating a plurality of amorphous materials, the laminated structure is cut into plural portions, the plural portions are stacked, and the stacked plural portions are wound into the shape of an iron core.

Two types of joint structures for joining the ends of the amorphous materials when the stacked plural portions are wound into the shape of an iron core are known: one is a joint structure that uses an overlap joint (superimpose joint) and the other is a joint structure that uses a step lap joint (heading joint). An overlap joint is performed in a joint mode in which laminated amorphous materials are disposed in such a way that the individual ends of the laminated amorphous materials overlap each other. On the other hand, a step lap joint is performed in a joint mode in which laminated amorphous materials are disposed in such a way that the individual ends of the laminated amorphous materials butt heads with each other with predetermined spaces therebetween without overlapping each other.

Here, a wound iron core is known well that is disclosed by Japanese Unexamined Patent Application Publication No. 2010-263233 that proposes a transformer having improved magnetic flux distributions in its iron cores and excellent iron core characteristics. In Japanese Unexamined Patent Application Publication No. 2010-263233, an approach is proposed in which, in order to improve a magnetic flux distribution inside an iron core, attention is paid to the joint structure of the individual ends of amorphous materials, an overlap joint is adopted as a junction mode for the joint structure, and the lengths of the overlap margins of the lapped portions of the individual ends of amorphous materials are adjusted to try to smooth the magnetic flux distribution inside the iron core.

SUMMARY OF THE INVENTION

The technology disclosed in Japanese Unexamined Patent Application Publication No. 2010-263233 is a technology in which magnetic resistances are adjusted by using the overlap margins of an overlap joint portion to try to smooth a magnetic flux distribution inside an iron core. However, there is naturally a limit to the adjustment of the overlap margin as shown in Japanese Unexamined Patent Application Publication No. 2010-263233. For example, in the case of shortening the overlap margins, if the overlap margins are less than about 5 mm, the frictions on the joint surfaces of a lap joint portion will decrease, which makes fixation difficult, and the deterioration of the iron loss of the iron core will also grow larger.

Furthermore, the maximum lengths of the overlap margins are determined by the total length of the lap joint portion and how many a lapped portion is divided into, so it is considered that the maximum lengths of the overlap margins are limited to about several tens of millimeters at most. Therefore, it is difficult to provide a sufficient gradient to the magnetic resistances, and there is a possibility that the effect of smoothing the magnetic flux distribution inside the iron core is not sufficient.

Here, although it is secondary, as the overlapped portions are longer, the number of portions, the thicknesses of which from the inner peripheral side to the outer peripheral side of a wound iron core become large, increases, and further, if overlap margins are formed on all the joint surfaces, the thickness of the lap joint portion of the wound iron core increases twice the thickness of a leg portion of a transformer. As a result, a problem arises that the size of the transformer increases, and at the same time, the amounts of the iron cores increase, which leads to an increase in cost.

A main object of the present invention is to provide a static induction electric apparatus capable of further improving the smoothness of magnetic flux distributions inside iron cores. Here, although the wound iron core described above is an example using amorphous materials, the present invention can also be applied to a wound iron core using silicon steel sheets.

One example of the main features of the present invention resides in a stationary induction electric apparatus with wound iron cores and a winding, wherein each wound iron core is a laminated body of magnetic materials that are lap-jointed and provided with a step lap joint portion on the inner peripheral side of the wound iron core, and gap distances between the ends of the step lap joint portion are gradually shortened toward the outer peripheral side of the wound iron core.

In addition, another feature of the present invention resides in a stationary induction electric apparatus that is provided with an overlap joint portion outside the outer periphery of the step lap joint portion, and the overlap distances of the overlapped portions of the overlap joint portion increases increase toward the outer peripheral side of the wound iron core.

According to the present invention, a stationary induction electric apparatus having the improved smoothnesses of magnetic flux distributions inside iron cores can be provided while the configuration of the stationary induction electric apparatus is simple.

DETAILED DESCRIPTION OF THE PREFERRED EMBODIMENTS

Hereinafter, although embodiments of the present invention will be explained with reference to the accompanying drawings, the present invention is not limited to the following embodiments, and includes various modifications and application examples within the technical concept of the present invention.

First Embodiment

Figure 1:
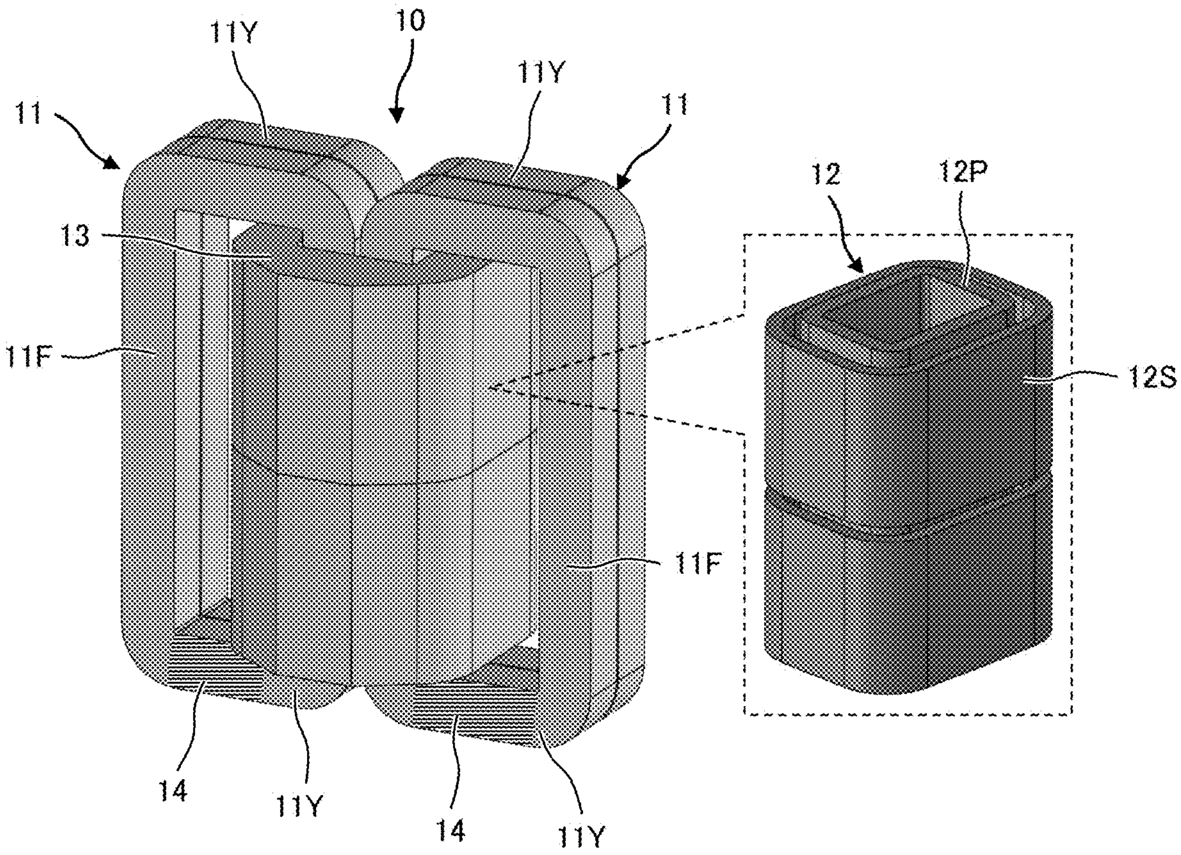
FIG. 1 is an external view showing the external configuration of a molded transformer to which the present invention is applied.
Figure 2:
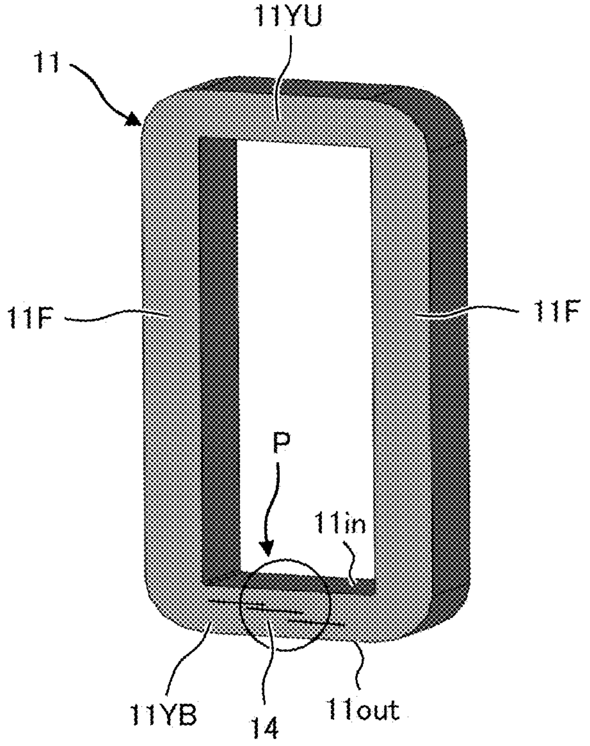
FIG. 2 is an external view showing the external appearance of a wound iron core shown in FIG. 1.
Figure 3:
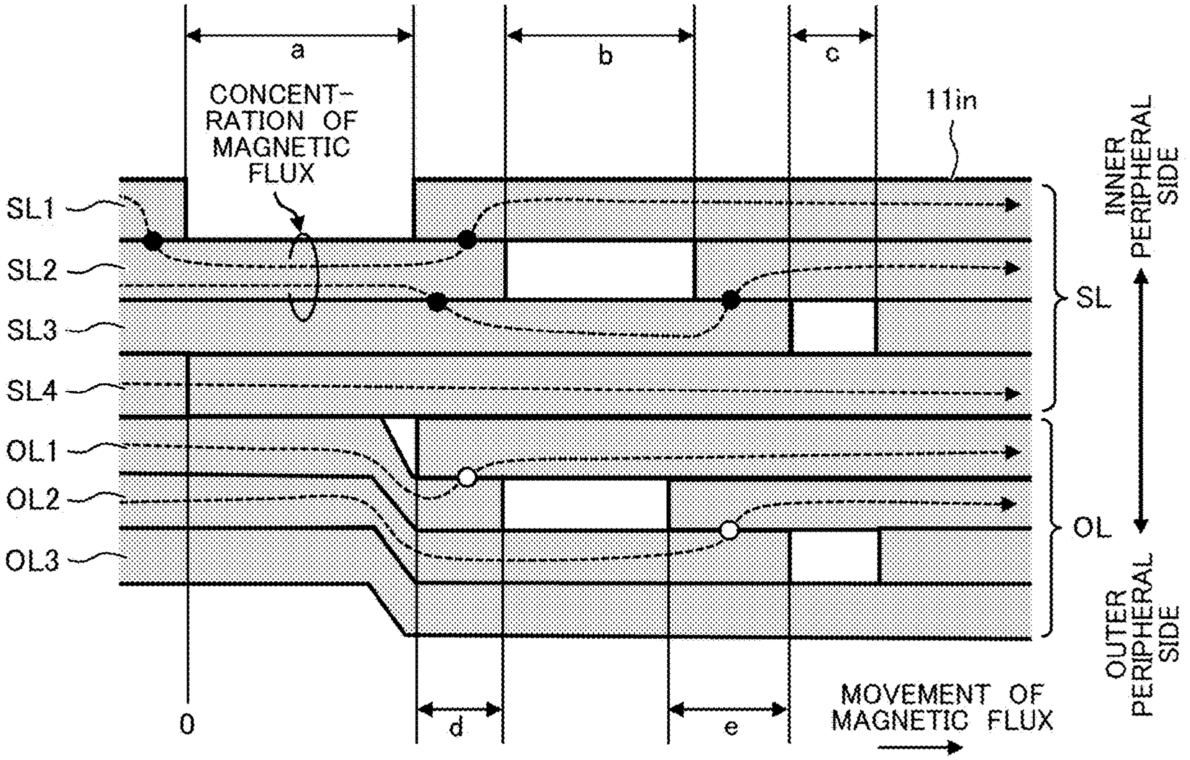
FIG. 3 is an enlarged cross-sectional view showing an enlarged cross-sectional surface of a portion near to the ends of a wound iron core according to the first embodiment of the present invention.

Next, a first embodiment of the present invention will be explained below. FIG. 1 shows the structure of a transformer to which the present invention is applied, FIG. 2 shows the external appearance of a wound iron core shown in FIG. 1, and FIG. 3 shows an enlarged cross-sectional surface of P portion (a lap joint portion) shown in FIG. 2.

As shown in FIG. 1, a transformer main body 10 is roughly composed of two iron core portions 11 and a winding (coil) 12. It will be assumed that this transformer main body 10 is an iron core type transformer, and each iron core portion 11 includes two leg portions 11F and two yoke portions 11Y. As shown in FIG. 1, one of the two yoke portions 11Y connects the upper ends of the two leg portions 11F, and the other connects the lower ends of the two leg portions 11F. One of the two leg portions 11F of one iron core portion 11 and one of the two leg portions 11F of the other iron core portion 11 are firmly attached to each other, and the winding 12 is wound around a combination of these firmly attached leg portions 11F. The winding 12 is composed of a primary winding 12P and a secondary winding 12S, the primary winding 12P is wound around the combination of the abovementioned firmly attached leg portions 11F, and the secondary winding 12S is wound around the outer periphery of the primary winding 12P.

Here, if the transformer is an oil-filled transformer, the transformer main body 10 is housed in a tank and fixed, while, if the transformer is a molded transformer, the winding 12 of the transformer main body 10 is molded by a synthetic resin 13 as shown in FIG. 1. The primary winding 12P and the secondary winding 12S are surrounded with (molded by) the synthetic resin 13, which ensures both electrical insulation and mechanical strength.

The iron core portion 11 has a configuration in which sheet-shaped amorphous materials (in the present embodiment, iron-based amorphous alloy sheets are used) or silicon steel sheets that are stacked and laminated are used, and in a yoke portion 11Y on the lower side of the iron core portion 11, a lap joint portion 14 is formed in which the ends of amorphous materials or the ends of silicon steel sheets are joined to face each other. Generally speaking, there are many cases where this lap joint portion 14 is formed in the yoke portion 11Y on the lower side of the iron core portion 11.

Next, the main part of the lap joint portion 14 of the iron core portion 11 shown in FIG. 1 will be described with reference to FIG. 2 and FIG. 3. FIG. 2 shows the external appearance of the iron core portion 11 that is shown in FIG. 1 and extracted from FIG. 1.

In FIG. 2, the iron core portion 11 is made of a laminated material obtained by stacking and laminating thin belt-type magnetic materials (hereinafter referred to as "magnetic path forming thin belts") composed of sheet-type amorphous materials or silicon steel sheets, and includes a pair of long leg portions 11F facing each other as well as a short upper yoke portion 11YU and a lower yoke portion 11YB that face each other and integrally and continuously connect the upper ends and the bottom ends of the pair of leg portions 11F respectively.

Here, in the lower yoke portion 11YB, the well-known lap joint portion 14 in which the ends of a plurality of magnetic path forming thin belts face each other and are magnetically joined is formed. Therefore, in the iron core portion 11, a closed magnetic path can be formed via this lap joint portion 14. In the present embodiment, this lap joint portion 14 is aassumed to be a composite joint portion including a step lap joint portion and an overlap joint portion. And the step lap joint portion is formed on the side of the inner peripheral surface 11in of the lower yoke portion 11YB, and the overlap joint portion is formed from the outer peripheral side of the step lap joint portion toward the side of the outer peripheral surface 11out of the lower yoke portion 11YB.

FIG. 3 shows an enlarged cross-sectional surface of P portion (lap joint portion 14) shown in FIG. 2. This cross-sectional surface shows a state of a cross-sectional surface obtained by cutting off the lower yoke portion 11YB of the iron core portion 11 in the extending direction of the leg portions 11F.

FIG. 3 shows that the lap joint portion 14 includes two layers, that is, a step lap joint portion SL formed on the side of the inner peripheral surface 11in of the lower yoke 11YB (refer to FIG. 2) and an overlap joint portion OL formed from the outer peripheral side of the step lap joint portion SL toward the outer peripheral surface 11out of the lower yoke YB (refer to FIG. 2).

As described before, the step lap joint portion SL is put in a joint mode in which the portion SL's magnetic path forming thin belts are disposed in such a way that the ends of each of the magnetic path forming thin belts are butted to face each other with a predetermined space therebetween without overlapping each other. On the other hand, the overlap joint portion OL is put in a joint mode in which the portion OL's magnetic path forming thin belts are disposed in such a way that the ends of each of the magnetic path forming thin belts overlap each other. Here, the step lap joint portion SL is located on the inner peripheral side of the iron core portion 11, and the overlap joint portion OL is located from the outer peripheral side of the step lap joint portion SL toward the outer peripheral surface 11out of the iron core portion 11.

In FIG. 3, when viewed from the inner peripheral surface 11in of the lower yoke 11YB to the outer peripheral side of the lower yoke 11YB, a first magnetic path forming thin belt layer SL1, a second magnetic path forming thin belt layer SL2, a third magnetic path forming thin belt layer SL3, and a fourth magnetic path forming thin belt layer SL4 are laminated in this order. These magnetic path forming thin belt layers SL1 to SL4 are step-lap jointed, and the ends of each of the magnetic path forming thin belt layers SL1 to SL4 are butted to face each other.

Furthermore, a gap distance between two facing ends in the first magnetic path forming thin belt layer SL1 is set to "a"; a gap distance between two facing ends in the second magnetic path forming thin belt layer SL2 is set to "b"; a gap distance between two facing ends in the third magnetic path forming thin belt layer SL3 is set to "c"; and a gap distance between two facing ends in the fourth magnetic path forming thin belt layer SL4 is set to "0", that is, the two facing ends are in contact with each other. In addition, there is a relationship of "a>b>c>0" between these gap distances. That is, the gap distance of a magnetic path forming belt layer closer to the inner peripheral surface 11in is set to be gradually (including stepwise) longer (in other words, the gap distance of a magnetic path forming belt layer closer to the outer peripheral side is set to be gradually (including step by step) shorter).

In addition, in FIG. 3, when viewed from the step lap joint portion SL of the lower yoke 11YB to the outer peripheral side, a fifth magnetic path forming thin belt layer OL1, a sixth magnetic path forming thin belt layer OL2, and a seventh magnetic path forming thin belt layer OL3 are laminated in this order. These magnetic path forming thin belt layers OL1 to OL3 are overlap jointed, and the ends of each of the magnetic path forming thin belt layers OL1 to OL3 are disposed to overlap each other.

Furthermore, the overlap distance of the overlapped portion of the ends of the fifth magnetic path forming thin belt layer OL1 is set to "d"; and the overlap distance of the overlapped portion of the ends of the sixth magnetic path forming thin belt layer OL2 is set to "e". In addition, there is a relationship of "d<e" between these overlap distances. That is, the overlap distance of a magnetic path forming belt layer closer to the outer peripheral surface 11out is set to be longer. Here, although the overlap distance of the overlapped portion of the ends of the seventh magnetic path forming thin belt layer OL3 is not shown in FIG. 3, this overlap distance is set to be longer than the overlap distance "e" of the sixth magnetic path forming thin belt layer OL2.

In FIG. 3, the magnetic fluxes that move in the magnetic path forming thin belts are shown by dashed arrows. In the step lap joint portion SL, a magnetic flux moves twice between SL1 and SL2 or between SL2 and SL3 (indicated by two black circles). On the other hand, in the overlap junction OL, a magnetic flux moves through the overlapped portion of OL1 itself or the overlapped portion of OL2 itself once (indicated by a white circle). Such differences in the movements of the magnetic fluxes appear as differences in the magnetic resistances of the magnetic path forming thin belt layers (SL1 to SL4 and OL1 to OL3) and the same can be said for the exciting currents and iron losses. And then, the magnetic resistances in the iron core change according to the lengths of portions through which the magnetic fluxes cross (referred to as "crossing portions").

For example, when attention is paid to the number of magnetic flux crossings related to the gap distances in the step lap joint portion SL, the number of magnetic flux crossings for one magnetic flux to cross between SL1 and SL2 or between SL2 and SL3 is two as described above. The longer a gap space is, the larger the relevant magnetic resistance becomes. For example, since a distance (equivalent to "a") of a portion in the second magnetic path forming thin layer SL2 that is adjacent to the gap distance "a" in the first magnetic path forming thin layer SL1 and in which magnetic fluxes concentrate is larger compared with the gap distance "b" of the second magnetic path forming thin layer SL2, the relevant magnetic resistance becomes larger. The same can be said for the relevant exciting current and iron loss. The same is also true for the gap spaces "b" and "c".

As described above, in the step lap joint portion SL, it is possible to obtain a characteristic that magnetic resistances become smaller as the gap distances gradually (including stepwise) become shorter in such a way as "a>b>c" from the inner peripheral side of the iron core portion 11 toward the outer peripheral side.

On the other hand, when attention is paid to the number of magnetic flux crossings related to the overlapped portions in the overlap joint portion OL, it is sufficient for a magnetic flux to cross once over the overlapped portion of OL1 or the overlapped portion of OL2, magnetic resistances in the overlap joint portion OL are smaller than those in the step lap joint portion SL, and magnetic fluxes concentrate in the overlapped portions. Here, the overlap distance "d" of the fifth magnetic path forming thin belt layer OL1 is set to be shorter than the overlap distance "e" of the sixth magnetic path forming thin belt layer OL2. Therefore, the concentration of the magnetic flux in the overlapped portion of the fifth magnetic path forming thin belt layer OL1 becomes larger, so that the relevant magnetic resistance also becomes larger (The same is true for the relevant exciting current and iron loss). As mentioned above, in the overlap joint portion OL, it is possible to obtain a characteristic that magnetic resistances become smaller as the overlapped distances gradually (including stepwise) become longer in such a way as "d<e" from the inner peripheral side of the iron core portion 11 toward the outer peripheral side.

According to the present embodiment, in the lap joint portion 14 of the lower yoke 11YB of the iron core portion 11, the step lap joint portion SL having the large magnetic resistances on the inner peripheral side of the lower yoke 11YB, and at the same time, the gap spaces between the ends of the respective magnetic path forming thin belt layers of the step lap joint portion SL are set to be gradually (including stepwise) shorter toward the outer peripheral side. Furthermore, the overlap joint portion OL having the small magnetic resistances is formed outside the outer periphery of the step lap joint portion SL, and the distances of the overlapped portions of the ends of the respective magnetic path forming thin belt layers of the overlap joint portion OL are set to be gradually (including stepwise) longer toward the outer peripheral side of the overlap joint portion OL. By adopting such a configuration described above, the smoothness of a magnetic flux distribution in the iron core portion 11 can be improved from the inner peripheral side of the iron core portion 11 toward the outer peripheral side.

Figure 4:
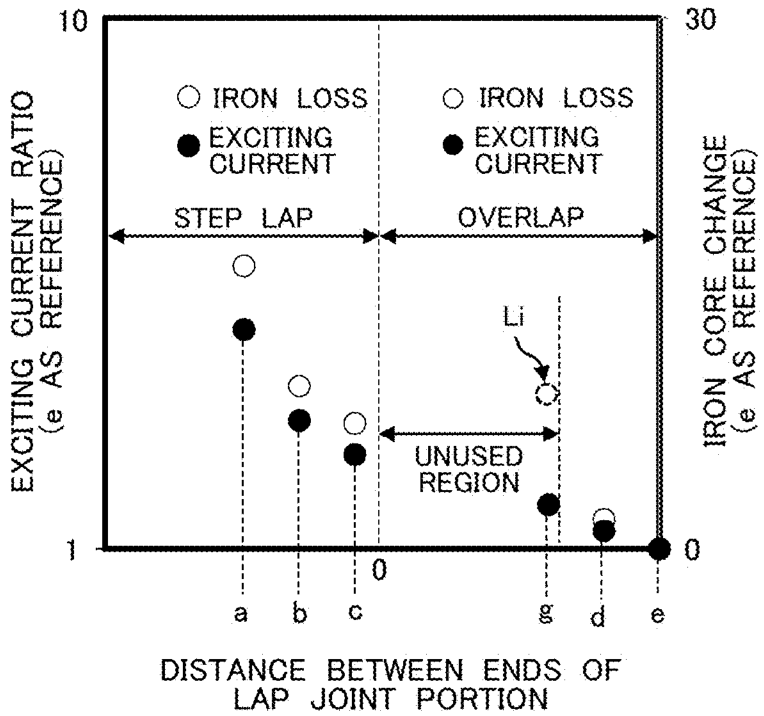
FIG. 4 is an explanatory diagram for explaining a relationship between lengths between the lapped portions shown in FIG. 3 and changes in iron losses/exciting current ratios.

FIG. 4 shows a graph in which the horizontal axis represents the gap distances in the step lap joint portion SL and the overlap distances in the overlap joint portion OL, and the vertical axis represents iron losses and exciting current ratios. Here, the gap distances are represented by "+" (positive), and the overlap distances are represented by "−" (negative). In addition, a state between a gap distance and an overlapped portion, that is, a state in which ends are in contact with each other is represented by "0". Here, as a reference for comparison, the sixth magnetic path forming thin belt layer OL2 positioned at the outermost periphery in FIG. 3 is employed.

As shown in FIG. 4, comparing iron loss changes and exciting current rations corresponding to the gap distances of the step lap joint portion SL indicated by "a", "b", and "c", an iron loss change and an exciting current ratio corresponding to a longer gap distance become larger that much, so it turns out that magnetic resistances increase toward the inner peripheral side of the iron core portion 11. Furthermore, when comparing iron loss changes and exciting current rations corresponding to the overlap distances of the overlap joint portion OL shown by "d" and "e", the iron loss change and the exciting current ratio corresponding to the shorter overlap distance become larger, so it turns out that magnetic resistances increase toward the inner peripheral side of the iron core portion 11.

However, when comparing the overlap joint with the step lap joint, it has been explained that the step lap joint has higher magnetic resistances and exciting currents, but the same is not necessarily true for iron losses. As shown in FIG. 4, when an overlap distance is made shorter (an overlapping distance indicated by g) in the overlap joint, there is a phenomenon in which an iron loss change Li (a dashed white circle) increases rapidly, so that in some cases, iron losses in the case of the overlap joint become larger than iron losses in the case of the step lap joint. For this reason, in the present embodiment, a region where overlap distances are shorter than "g" is set to be a region that is not used (unused region) in the overlap joint portion OL.

Therefore, rather than forming the lap joint portion 14 only by using the overlap joint having small magnetic resistances and small exciting currents, controlling the magnetic resistances by combining the step lap joint and the overlap joint as in the present embodiment makes it possible to realize low iron losses. In addition, the present embodiment has a wider adjustment range than using only the overlap joint, and an effect of suppressing an increase in the thickness of the iron core portion can also be expected.

In the embodiment described above, it is not always necessary that the adjustment portion formed in the step lap joint portion SL and the overlap joint portion OL must be formed over the entire area from the inner peripheral surface 11in of the iron core portion 11 to the outer peripheral surface 11out of the iron core portion 11.

It is generally known that a magnetic flux density at a position about ⅓ of the distance from the inner peripheral surface to the outer peripheral surface of the lap joint portion 14 exhibits a value close to the average magnetic flux density of the entirety of the iron core portion 11. For this reason, as is the case with the present embodiment, the adjustment portion using the step lap joint portion SL and the overlap joint portion OL may be formed within a range from the inner peripheral surface 11in of the iron core portion 11 to the abovementioned ⅓ of the distance from the inner peripheral surface to the outer peripheral surface of the lap joint portion 14, and distances between the ends of lapped portions outside the above range may have the same lengths.

As described above, according to the present embodiment, the wound iron core is a laminated body of magnetic materials that are lap-joined, the step lap joint portion is provided on the inner peripheral side of the wound iron core, and the gap distances between the ends of the step lap joint portion are gradually (including stepwise) becoming shorter toward the outer peripheral side of the step lap joint portion. Furthermore, the overlap joint portion is provided outside the outer periphery of the step lap joint portion, and the overlap distances of the overlapped portions of the overlap joint portion increases toward the outer peripheral side of the overlap joint portion. According to the above-described wound iron core, a stationary induction electric apparatus having the improved smoothness of a magnetic flux distribution inside the wound iron core can be provided while the configuration of the stationary induction electric apparatus is simple.

Second Embodiment

Figure 5:
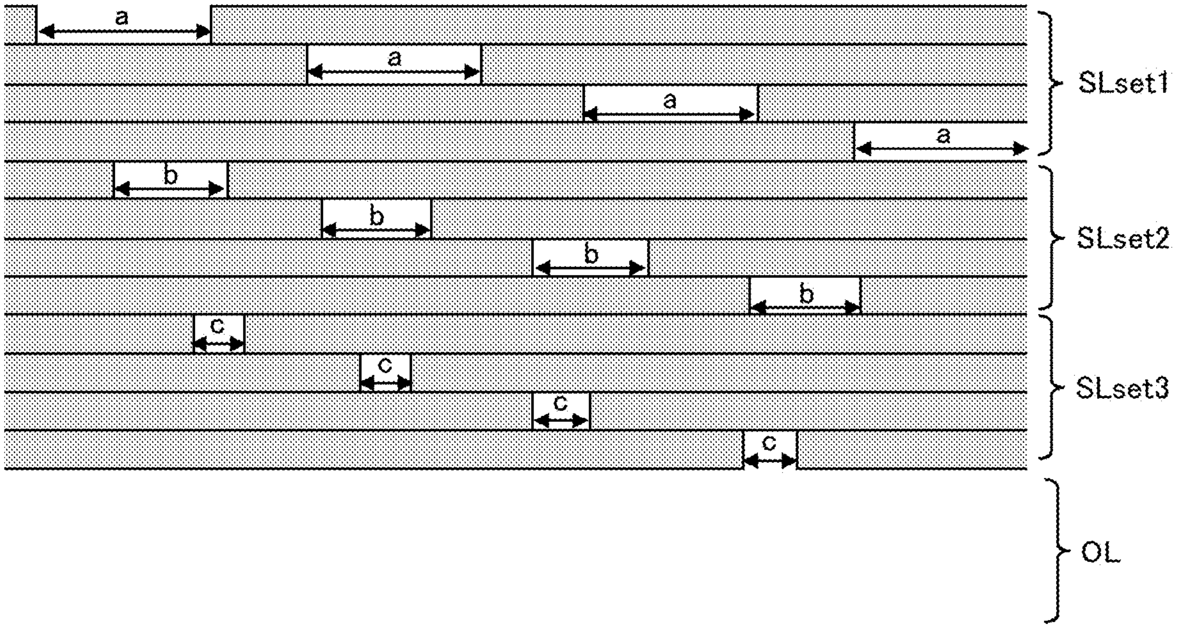
FIG. 5 is an enlarged cross-sectional view showing an enlarged cross-sectional surface of a portion near to the ends of a wound iron core according to the second embodiment of the present invention.

Next, a second embodiment of the present invention will be explained. FIG. 5 shows the configuration of a step lap joint portion SL according to the second embodiment. The step lap joint portion SL is different from the step lap joint portion according to the first embodiment in that the step lap joint portion SL according to the second embodiment is composed of three blocks (SLset1, SLset2, and SLset3). Here, an overlap joint portion OL according to the second embodiment is omitted from FIG. 5.

In general, a magnetic path forming thin belt includes 10 to 20 layers as one mass, but in the first embodiment (FIG. 4), the gap distance of the second magnetic path forming thin belt layer SL2 adjacent to the first magnetic path forming thin belt layer SL1, the gap distance of the third magnetic path forming thin belt layer SL3 adjacent to the second magnetic path forming thin belt layer SL2, and the like are shown to be successively shorter in order to make it easier to understand differences in the gap distances of these magnetic path forming thin belt layers. In an actual iron core portion 11, it is desirable to form 5 to 10 layers with the same gap distances.

In other words, in the case where, as a step lap joint portion SL having the same gap distances, a plurality of laminated magnetic path forming thin belts (four layers in the present embodiment) are collectively set to be one set, the gap distances of a first step lap set joint portion SLset1 composed of four layers are set to be "a", the gap distances of a second step lap set joint portion SLset2 composed of four layers outside the outer periphery of SLset1 are set to be "b", and the gap distances of a third step lap set joint portion SLset3 composed of four layers outside the outer periphery of SLset2 are set to be "c".

Here, as is the case with the first embodiment, since the gap distances are set to be "a>b>c" from the inner peripheral side of the iron core portion 11 toward the outer peripheral side, it is possible to obtain a characteristic that magnetic resistances decrease as the gap distances are gradually (including stepwise) shortened. In this way, magnetic path forming thin belts of a predetermined number of laminated layers (for example, 5 to 10 layers) having the same gap distances are set as one set, and it is desirable to combine the one set and different sets the gap distances of which are gradually (including stepwise) shortened and disposed outside the one set as the actual configuration.

Third Embodiment

Figure 6:
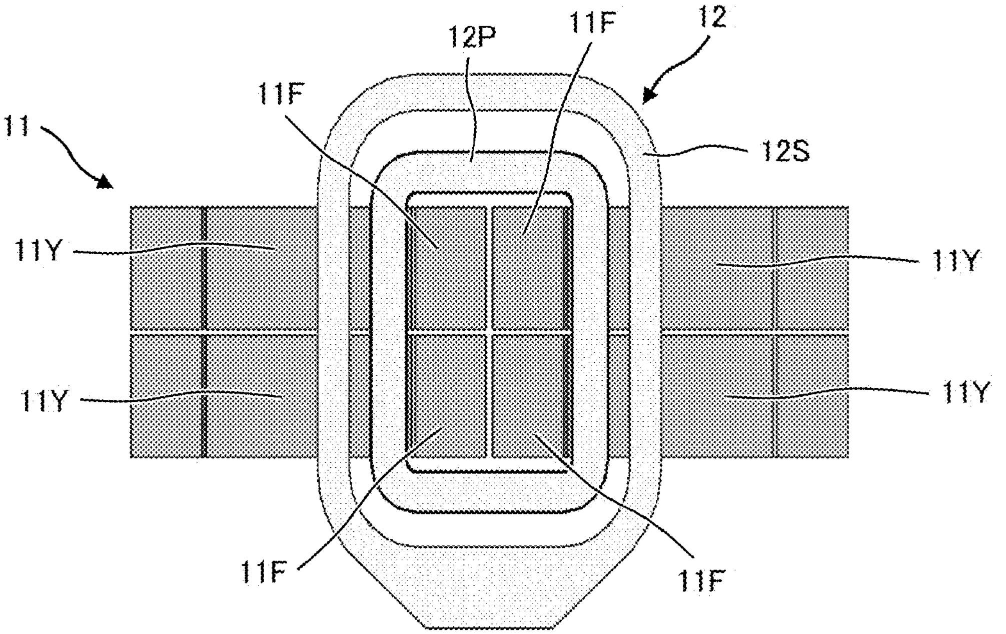
FIG. 6 is a diagram showing cross-sectional views of windings wound around the leg portions of a transformer, in which the cross-sectional surfaces are approximately rectangular.
Figure 7:
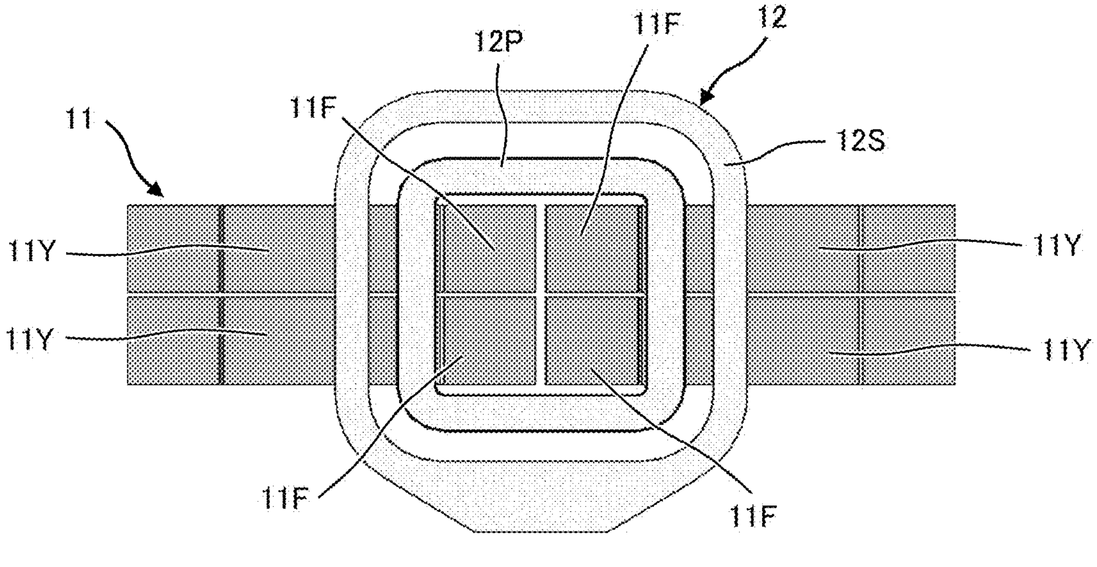
FIG. 7 is a diagram showing cross-sectional views of windings wound around the leg portions of a transformer, in which the cross-sectional surfaces are approximately square.

Next, a third embodiment of the present invention will be explained. Although the first and second embodiments relate to the lapped portions of wound iron cores, the third embodiment relates to a transformer using the above-described wound iron cores. FIG. 6 and FIG. 7 show the relationship between a winding shape and an iron core shape of the transformer.

The cross-sectional shape of an iron core portion 11 and the cross-sectional shape of a winding 12 are generally rectangular as shown in FIG. 6. This is because, since the iron core portion 11, for which magnetic path forming thin belts made of, for example, amorphous materials are used, are manufactured by winding rectangular magnetic path forming thin belts, the direction of the main surfaces of the magnetic path forming thin belts is the depth direction of the paper surface, and the laminating direction of the magnetic path forming thin belts is the direction of the paper surface (vertical direction in FIG. 6).

Therefore, if the thickness in the laminating direction is increased, the difference between the length of the magnetic path in the innermost periphery and the length in the outermost periphery also increases, so that the cross-sectional shape of the iron core portion 11 and the cross-sectional shape of the winding 12 are set to be rectangular in order to make it difficult for the lamination thickness to increase. However, as shown in FIG. 6, the length of the long side and the length of the short side of the cross-sectional shape of the winding are different from each other, so it is possible that noises caused by the electromagnetic force of the winding 12 may increase.

On the other hand, in order to suppress the noises caused by the electromagnetic force of the winding 12, it is preferable that the cross-sectional shape of the iron core portion 11 and the cross-sectional shape of the winding 12 be square as shown in FIG. 7. Here, by using the wound iron core employing the lap joint portion described in the first and second embodiments, it becomes possible to adjust the lengths of the magnetic paths. Therefore, even if the iron core portion 11 and the winding 12 have square cross-sectional shapes, a magnetic flux distribution in the iron core portion 11 can be smoothed, so that the noise generation can be suppressed.

In this way, by configuring a transformer with a combination of the lap joint portion described in the first and second embodiments, the iron core portions 11 each of which has a square cross-sectional shape, and the winding 12 having a square cross-sectional shape, magnetic flux distributions can be smoothed and the flows of excessive currents can be suppressed, so that it becomes possible to provide a transformer in which losses and noises are suppressed.

In addition, the present invention can be applied not only to a transformer, but also to other stationary induction electric apparatus (for example, a reactor). Furthermore, the above-described embodiments are described in detail for easy understanding of the present invention, and are not necessarily limited to those having all the described configurations.

As described above, the present invention is a stationary induction electric apparatus including wound iron cores and a winding, and the stationary induction electric apparatus is characterized in that each wound iron core is a laminated body of magnetic materials that are lap-joined and at least provided with a step lap joint portion on the inner peripheral side of the wound iron core, and gap distances between the ends of the step lap joint portion are gradually shortened toward the outer peripheral side of the wound iron core.

According to the present invention, a stationary induction electric apparatus having the improved smoothnesses of magnetic flux distributions inside iron cores can be provided while the configuration of the stationary induction electric apparatus is simple.

In addition, the present invention is not limited to the above embodiments, and the present invention may include various kinds of modification examples. The above embodiments have been described in detail in order to explain the present invention in an easily understood manner, and the present invention is not necessarily limited to the embodiments which include all configurations that have been described so far. Furthermore, a part of the configuration of one embodiment can be replaced with a part of the configuration of another embodiment. It is also possible to add the configuration of one embodiment to the configuration of another embodiment. In addition, a new embodiment of the present invention may be made by adding another configuration to a part of the configuration of each embodiment, by deleting a part of the configuration of each embodiment, or by replacing a part of configuration of each embodiment with another configuration.

REFERENCE SIGNS LIST

10 . . . transformer main body
11 . . . iron core portion
11F . . . leg portion
11Y . . . yoke portion
11YU . . . upper yoke portion
11YB . . . lower yoke portion
11in . . . inner peripheral surface
11out . . . outer peripheral surface
12 . . . winding
12P . . . primary winding
12S . . . secondary winding
13 . . . synthetic resin
14 . . . lap joint portion
SL . . . step lap joint portion
OL . . . overlap joint portion

What is claimed is:

1. A stationary induction electric apparatus comprising wound iron cores and a winding, wherein each of the wound iron cores is formed by laminating magnetic path forming thin belts and at least provided with a step lap joint portion on an inner peripheral side of the wound iron core, and gap distances between ends of the step lap joint portion are gradually shortened toward an outer peripheral side of the wound iron core; and wherein each of the wound iron cores includes an overlap joint portion outside the outer periphery of the step lap joint portion and lengths of overlap distances of the overlapped portions of the overlap joint portion gradually increase toward the outer peripheral side of the wound iron core.

2. The stationary induction electric apparatus according to claim 1, wherein the step lap joint portion and the overlap joint portion are formed on a side of the inner peripheral surface of the wound iron core within a range of about ⅓ of a distance between the inner peripheral surface and the outer peripheral surface of the wound iron core.

3. The stationary induction electric apparatus according to claim 1, wherein a plurality of step lap set joint portions are formed each of which includes a plurality of magnetic path forming thin belt layers as one set, the gap distances of each step lap set joint portion are set to the same distances, and at the same time, the plurality of step lap set joint portions are disposed from the inner peripheral side to the outer peripheral side of the wound iron core and the gap distances of the plurality of step lap set joint portions are gradually shortened toward the outer peripheral side.

4. The stationary induction electric apparatus according to claim 1, wherein a cross-sectional shape of the wound iron core inside the winding is square, and a cross-sectional shape of the winding is also square.

5. The stationary induction electric apparatus according to claim 1, wherein the magnetic path forming thin belts are made of iron-based amorphous alloys or silicon steel sheets.

6. A stationary induction electric apparatus comprising:

a wound iron core which includes a pair of long leg portions facing each other;

a pair of short yoke portions integrally connecting the ends of the pair of leg portions; and a winding wound around the leg portions, wherein the wound iron core is laminated by stacking a plurality of magnetic path forming thin belts, and the plurality of laminated magnetic path forming thin belts are magnetically joined at a lap joint portion formed in one of the yoke portions to form a closed magnetic circuit, and the lap joint portion includes a step lap joint portion formed on an inner peripheral side of the wound iron core, and gap distances between ends of the step lap joint portion are formed so as to be gradually shortened toward an outer peripheral side of the wound iron core, and further includes an overlap joint portion outside the outer periphery of the step lap joint portion and lengths of the overlap distances of overlapped portions of the overlap joint portion stepwise increase toward the outer peripheral side of the wound iron core.

* * * * *